United States Patent [19]

Lewchuk

[11] Patent Number: 5,983,325
[45] Date of Patent: Nov. 9, 1999

[54] DATALESS TOUCH TO OPEN A MEMORY PAGE

[75] Inventor: W. Kurt Lewchuk, Austin, Tex.

[73] Assignee: Advanced Micro Devices, Inc., Sunnyvale, Calif.

[21] Appl. No.: 08/987,536

[22] Filed: Dec. 9, 1997

[51] Int. Cl.$^6$ ................................................ G06F 12/08
[52] U.S. Cl. .................... 711/137; 711/105; 711/146; 711/154
[58] Field of Search .................... 711/137, 105, 711/146, 154

[56] References Cited

U.S. PATENT DOCUMENTS

| | | | |
|---|---|---|---|
| 5,761,515 | 6/1998 | Barton, III et al. ..................... | 711/122 |
| 5,774,685 | 6/1998 | Dubey ..................... | 711/122 |
| 5,809,560 | 9/1998 | Schneider ..................... | 711/204 |

OTHER PUBLICATIONS

"PowerPC: Microprocessor Developer's Guide", Sams Publishing, Indianapolis, Indiana, 1995, pp. 212–213.
"Computer Architecture: A quantitative Approach", Hennessy and Patterson, Morgan Kauffman Publishers, Inc., 1990, pp. 431–432.

Primary Examiner—Reginald G. Bragdon
Attorney, Agent, or Firm—Conley, Rose & Tayon; Lawrence J. Merkel; B. Noel Kivlin

[57] ABSTRACT

A computer system supports a touch command which may be used to open a page in the main memory. Microprocessors within the computer system may determine an appropriate time at which to perform the touch command, and then transmit the touch command to the memory controller within the computer system. In response to the touch command, the memory controller opens the selected page but may not return data from the page. Subsequent memory operations may experience a page hit memory latency instead of a page miss memory latency due to the occurrence of the touch command. Data bus bandwidth is not consumed by the touch command. The touch command may be used even if actually prefetching data is not desirable. The microprocessors in the computer system may monitor which pages are experiencing cache hits within the microprocessors. If a page is experiencing cache hits, a cache miss within the page may be more probable. The touch command may be used to prepare the main memory system for a potential cache miss.

21 Claims, 6 Drawing Sheets

DATALESS TOUCH TO OPEN A MEMORY PAGE

BACKGROUND OF THE INVENTION

1. Field of the Invention

This invention is related to the field of computer systems and microprocessors, and, more particularly, to memory latency solutions within computer systems.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modem microprocessors. The memory access time for each set of bytes being transferred to the microprocessor is therefore long. Accordingly, the main memory system is not a low latency system. Microprocessor performance may suffer due to high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the effective memory latency. Cache misses require the access to receive data from the main memory, thereby increasing the effective memory latency.

Many types of DRAMs employ a "page mode" which allows for memory latency to be decreased for transfers within the same "page". Generally, DRAMs comprise memory arranged into rows and columns of storage. A first portion of the address identifying the desired data/instructions is used to select one of the rows (the "row address"), and a second portion of the address is used to select one of the columns (the "column address"). One or more bits residing at the selected row and column is provided as output of the DRAM. Multiple DRAMs may be accessed concurrently (a "bank") to provide more output bits per access. Typically, the row address is provided to the DRAM first, and the selected row is placed into a temporary buffer within the DRAM. Subsequently, the column address is provided and the selected data is output from the DRAM. If the next address to access the DRAM is within the same row (i.e. the row address is the same as the current row address) then that next access may be performed by providing the column portion of the address only, omitting the row address transmission. The next access may therefore be performed with lower latency, saving the time required for transmitting the row address. Addresses having the same row address are said to be in the same page. The size of the page may therefore be dependent upon the number of columns within the row and the number of DRAMs included within the bank. The row, or page, stored in the temporary buffer within the DRAM is referred to as the "open page", since accesses within the open page can be performed in page mode (i.e. by transmitting the column portion of the address only)

Unfortunately, the first access to a given page generally must occur in non-page mode, thereby incurring a higher memory latency. Even further, the access may experience a page mode miss (where the DRAMs still have a particular page open, and the particular page must first be closed before opening the page containing the current access). Often, this first access is critical to maintaining performance in the microprocessors within the computer system, as the data/instructions are immediately needed to satisfy a cache miss. Instruction execution may stall while the memory responds in non-page mode. A method for increasing the number of memory accesses performed in page mode is therefore desired.

SUMMARY OF THE INVENTION

The problems outlined above are in large part solved by a computer system in accordance with the present invention. The computer system supports a touch command which may be used to open a page in the main memory. Microprocessors within the computer system may determine an appropriate time at which to perform the touch command, and then transmit the touch command to the memory controller within the computer system. In response to the touch command, the memory controller opens the selected page but may not return data from the page. Subsequent memory operations may experience a page hit memory latency instead of a page miss memory latency due to the occurrence of the touch command. Advantageously, the memory latency experienced by the subsequent memory operations may be reduced due to the prior opening of the page via the touch command. Since the first subsequent memory operation may be critically needed by the program being executed, performance may be increased by the decreased memory latency experienced by the first subsequent memory operation. Data bus bandwidth is not consumed by the touch command either, and therefore performance in data-bus-bandwidth limited computer systems may not be impacted by the use of the touch command. Therefore, the touch command may be used even if actually prefetching data is not desirable.

The microprocessors in the computer system may monitor which pages are experiencing cache hits within the microprocessors. If a page is experiencing cache hits, a cache miss within the page may be more probable. The touch command may be used to prepare the main memory system for a potential cache miss. If the cache miss occurs, the memory latency experienced by the cache miss may be reduced.

Broadly speaking, the present invention contemplates a microprocessor comprising a load/store unit, a data cache, and a touch unit. The load/store unit is configured to perform a memory operation. Coupled to receive the memory operation from the load/store unit, the data cache is configured to determine if the memory operation hits in the data cache and to output a hit signal in response thereto. Coupled to receive the memory operation from the load/store unit, the touch unit is configured to generate a touch command in response to the memory operation and the hit signal indicating that the memory operation hits in the data cache.

The present invention further contemplates a computer system comprising a main memory, a microprocessor, and a memory controller. The microprocessor is configured to generate a touch command in response to a hit in a cache within the microprocessor by a memory operation. Coupled to the microprocessor and to the main memory, the memory controller is configured to open a page within the main memory corresponding to the memory operation responsive to the touch command.

Moreover, the present invention contemplates a method for decreasing memory latency in a computer system. A memory operation performed by a microprocessor within the computer system that hits in a cache within the microprocessor is detected. Responsive to the detecting, a touch command including an address corresponding to the memory operation is transmitted to a memory controller within the computer system. A page within a memory coupled to the memory controller is opened responsive to the transmitting of the touch command.

The present invention still further contemplates a touch unit for a microprocessor, comprising a control unit and at least one register. The register is configured to store a first address corresponding to a first touch command previously generated by the touch unit. Coupled to the register and to receive a second address corresponding to a memory operation and a hit signal indicative of a hit/miss status of the memory operation in a cache, the control unit is configured to generate a second touch command responsive to the second memory operation. The control unit generates the second touch command if: (i) the second memory operation is a hit in the cache; and (ii) the second address is in a different page than the first address.

BRIEF DESCRIPTION OF THE DRAWINGS

Other objects and advantages of the invention will become apparent upon reading the following detailed description and upon reference to the accompanying drawings in which.

Figure 1:
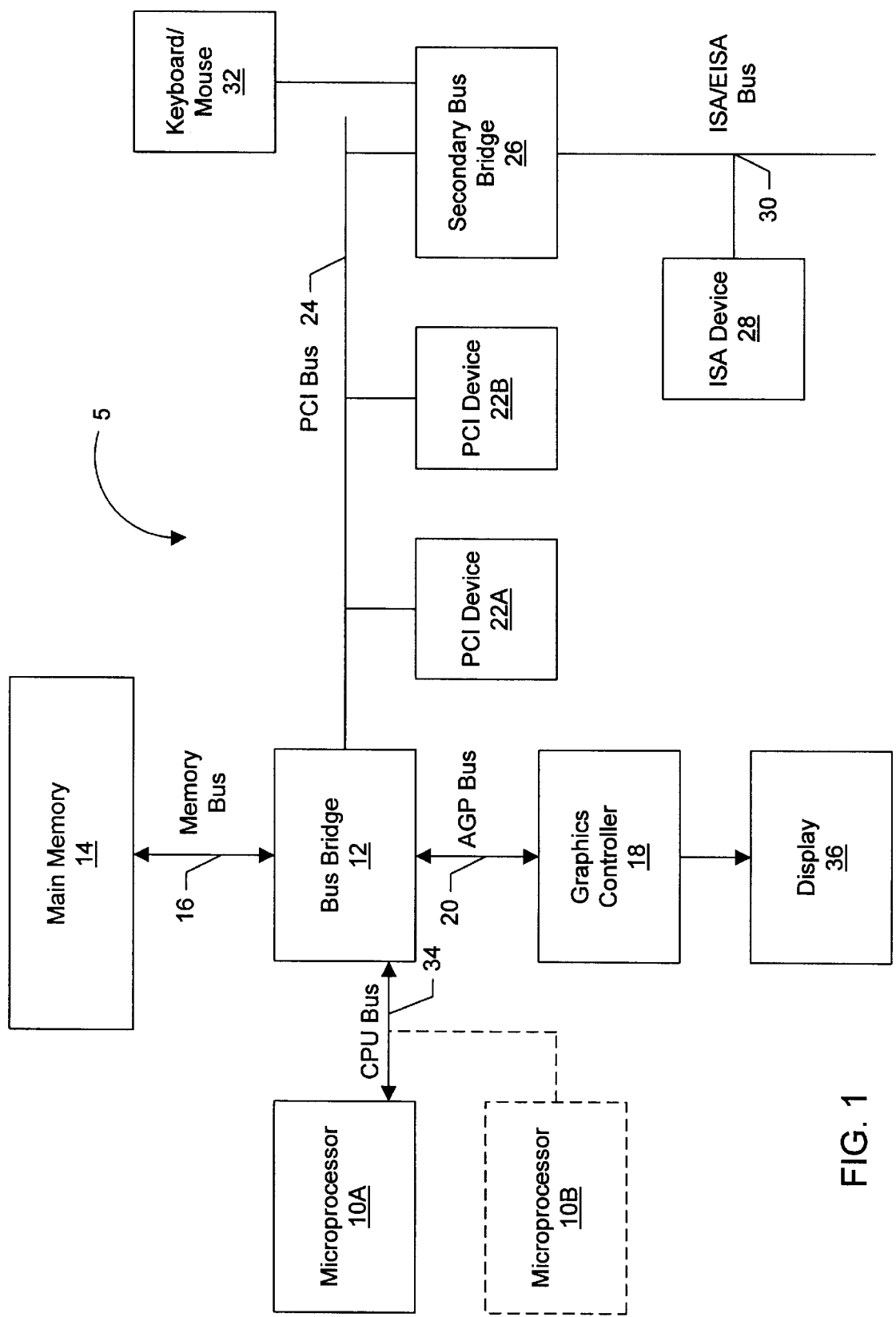
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system 5 including one or more microprocessors (e.g. microprocessors 10A and 10B shown in FIG. 1) coupled to a variety of system components through a bus bridge 12 is shown. Other embodiments are possible and contemplated. In the depicted system, a main memory 14 is coupled to bus bridge 12 through a memory bus 16, and a graphics controller 18 is coupled to bus bridge 12 through an AGP bus 20. A plurality of PCI devices 22A–22B are coupled to bus bridge 12 through a PCI bus 24. A secondary bus bridge 26 may further be provided to accommodate an electrical interface to one or more EISA or ISA devices 28 through an EISA/ISA bus 30. Microprocessors 10A and 10B are coupled to bus bridge 12 through a CPU bus 34. Alternatively, independent buses may be coupled between bus bridge 12 and each of microprocessors 10A and 10B. As illustrated by the dotted illustration of microprocessor 10B, embodiments of computer system 5 employing only one microprocessor are contemplated. Additionally, embodiments employing more than two microprocessors are contemplated.

Generally speaking, microprocessors 10A and 10B are configured to initiate memory operations upon CPU bus 34 in order to transfer data to and from main memory 14. Additionally, microprocessors 10A and 10B are configured to initiate a touch command upon CPU bus 34 in order to open a DRAM page within main memory 14 to reduce memory latency. Microprocessors 10A and 10B are configured to determine an appropriate time at which to initiate a touch command. For example, microprocessors 10A and 10B may detect that cache hits are occurring to a page which may currently not be open within main memory 14. A touch command may be generated to open the page in anticipation of a potential cache miss within the page. If the cache miss occurs, the cache miss may experience a page mode hit memory latency, as opposed to a page mode miss memory latency. Advantageously, memory latency may be decreased for cache misses. In another embodiment, microprocessors 10A and 10B may provide an instruction to be used when a programmer/compiler determines that a touch command would be useful. As used herein, a "touch command" is an operation upon CPU bus 34 which is defined to indicate that a particular page within main memory 14 is to be opened. The touch command may be an address-only transfer (i.e. no data is transmitted across CPU bus 34 and memory bus 16 in response to the touch command). The address conveyed along with the touch command indicates the page to be opened. The touch command is assigned a unique encoding on CPU bus 34 so that bus bridge 12 can recognize the touch command as different than read/write operations and other operations which may be performed upon CPU bus 34.

CPU bus 34 may be a split address/data bus in which separate lines are used to transfer the addresses of bus operations and the corresponding data. Since most bus operations transfer one address and a relatively large amount of data (e.g. a cache line), address bus bandwidth is often in excess (i.e. CPU bus 34 is often data-bus-bandwidth limited). Accordingly, touch commands may be performed using the excess address bus bandwidth.

Bus bridge 12 receives the memory operations initiated by microprocessors 10A and 10B, and transfers the data to/from main memory 14 via memory bus 16. The data is returned to the microprocessor 10A or 10B (if the data is a read memory operations) via CPU bus 34. Data is transferred to bus bridge 12 via CPU bus 34 for a write memory operation, and the data is subsequently transmitted to main memory 14 via memory bus 16. Additionally, bus bridge 12 receives the touch commands initiated by microprocessors 10A and 10B and may open a page within main memory 14 in response thereto. In one embodiment, bus bridge 12 treats touch commands as completely speculative operations. Since no response is returned to microprocessors 10A and 10B, and the opening of a page decreases memory latency but the lack of an open page does not cause incorrect operation to occur, bus bridge 12 may discard the touch command at any point if other, higher priority operations are to be performed.

As used herein, a "memory operation" is a transfer of data between an initiator and a memory (or a master and a slave, respectively). A "read memory operation" is a transfer of data from the slave (i.e. the memory) to the master. For example, microprocessor 10A or 10B may initiate a read memory operation to transfer data from main memory 14 to the microprocessor. A "write memory operation" is a transfer of data from the master to the slave (i.e. the memory). For example, microprocessor 10A or 10B may initiate a write memory operation to transfer data from the microprocessor to main memory 14. Memory operations may be of different sizes. However, memory operations to transfer data to and from the cache (e.g. prefetch memory operations and many fetch memory operations) may be performed using a cache line size.

In addition to the above described functionality, bus bridge 12 generally provides an interface between microprocessors 10A and 10B, main memory 14, graphics controller 18, and devices attached to PCI bus 24. When an operation is received from one of the devices connected to bus bridge 12, bus bridge 12 identifies the target of the operation (e.g. a particular device or, in the case of PCI bus 24, that the target is on PCI bus 24). Bus bridge 12 routes the operation to the targeted device. Bus bridge 12 generally translates an operation from the protocol used by the source device or bus to the protocol used by the target device or bus and routes the operation appropriately. Bus bridge 12 may further be responsible for coherency activity to ensure a proper result for the operation, etc.

In addition to providing an interface to an ISA/EISA bus from PCI bus 24, secondary bus bridge 26 may further incorporate additional functionality, as desired. For example, in one embodiment, secondary bus bridge 26 includes a master PCI arbiter (not shown) for arbitrating ownership of PCI bus 24. An input/output controller (not shown), either external from or integrated with secondary bus bridge 26, may also be included within computer system 5 to provide operational support for a keyboard and mouse 32 and for various serial and parallel ports, as desired. An external cache unit (not shown) may further be coupled to CPU bus 34 between microprocessors 10A and 10B and bus bridge 12 in other embodiments. Alternatively, the external cache may be coupled to bus bridge 12 and cache control logic for the external cache may be integrated into bus bridge 12.

Main memory 14 is a memory in which application programs are stored and from which microprocessors 10A and 10B primarily execute. A suitable main memory 14 comprises DRAM (Dynamic Random Access Memory), SDRAM (Synchronous DRAM), or RDRAM (RAMBUS DRAM).

PCI devices 22A–22B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 28 is illustrative of various types of peripheral devices, such as a modem, a sound card, and a variety of data acquisition cards such as GPIB or field bus interface cards.

Graphics controller 18 is provided to control the rendering of text and images on a display 36. Graphics controller 18 may embody a typical graphics accelerator generally known in the art to render three-dimensional data structures which can be effectively shifted into and from main memory 14. Graphics controller 18 may therefore be a master of AGP bus 20 in that it can request and receive access to a target interface within bus bridge 12 to thereby obtain access to main memory 14. A dedicated graphics bus accommodates rapid retrieval of data from main memory 14. For certain operations, graphics controller 18 may further be configured to generate PCI protocol transactions on AGP bus 20. The AGP interface of bus bridge 12 may thus include functionality to support both AGP protocol transactions as well as PCI protocol target and initiator transactions. Display 36 is any electronic display upon which an image or text can be presented. A suitable display 36 includes a cathode ray tube ("CRT"), a liquid crystal display ("LCD"), etc.

It is noted that, while the AGP, PCI, and ISA or EISA buses have been used as examples in the above description, any bus architectures may be substituted as desired.

Figure 2:
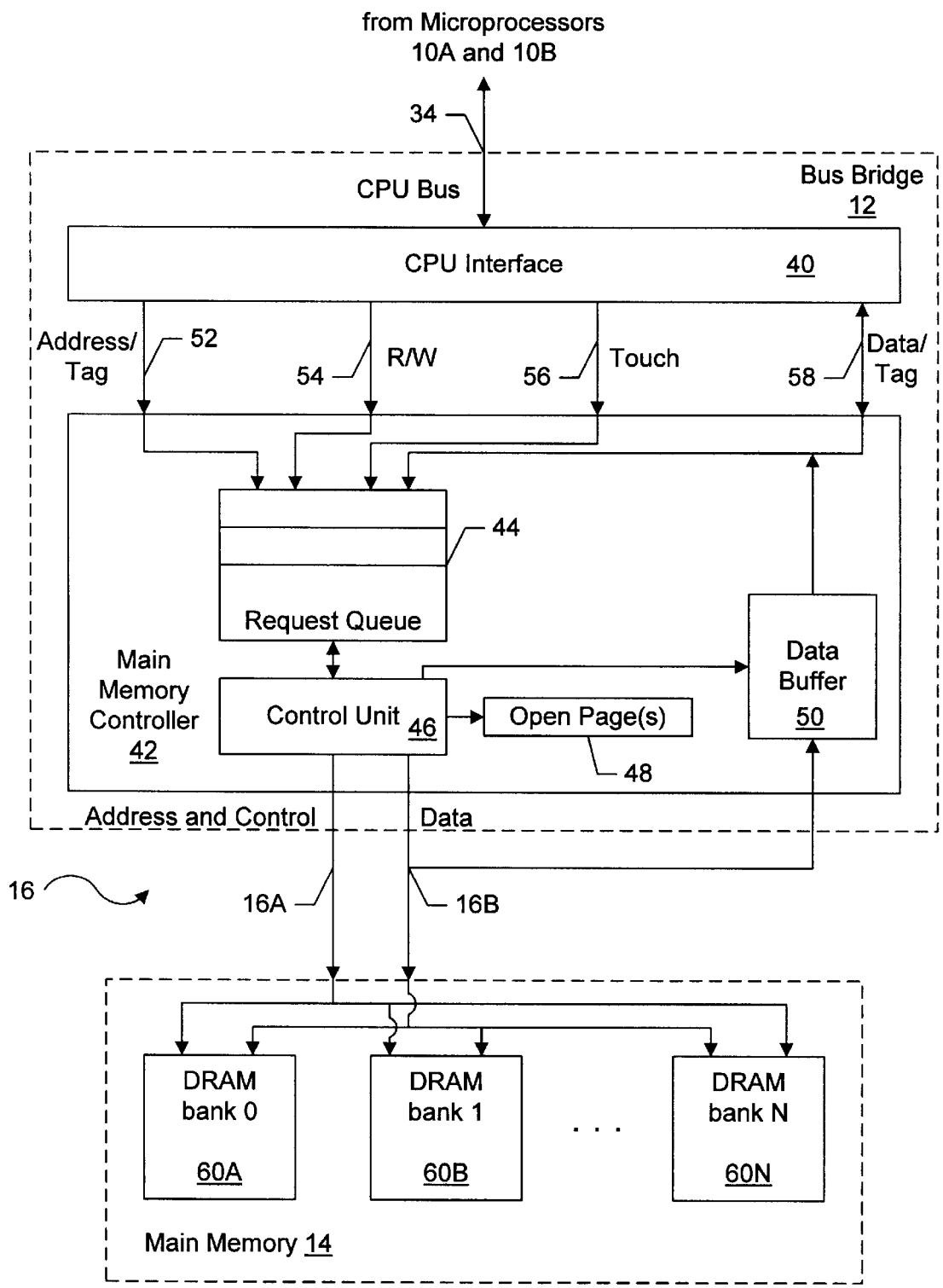
FIG. 2 is a block diagram of one embodiment of a bus bridge and a main memory illustrated in FIG. 1.

Turning now to FIG. 2, a block diagram of one embodiment of bus bridge 12 and main memory 14 is shown in greater detail. Other embodiments are possible and contemplated. Only portions of bus bridge 12 pertaining to the present disclosure are shown in FIG. 2. Other portions may be implemented as desired. As shown in FIG. 2, bus bridge 12 includes a CPU interface block 40 and a main memory controller 42. Main memory controller 42 may include a request queue 44, a control unit 46, an open page(s) storage 48, and a data buffer 50. CPU interface block 40 is coupled to CPU bus 34 and to main memory controller 42 via an address/tag bus 52, a R/W line 54, a touch line 56, and a data/tag bus 58. Each of address/tag bus 52, R/W line 54, touch line 56, and data/tag bus 58 are coupled to request queue 44, and data/tag bus 58 is coupled to data buffer 50. Request queue 44, data buffer 50, and open page storage 48 are coupled to control unit 46. Additionally, control unit 46 is coupled to an address and control bus 16A and a data bus 16B which comprise memory bus 16. Data buffer 50 is also coupled to data bus 16B. Main memory 14 comprises a plurality of DRAM banks 60A–60N. Each DRAM bank 60A–60N comprises one or more DRAMs, and each DRAM bank 60A–60N is coupled to memory bus 16. The DRAMs included in main memory 14 may comprise any type of DRAM, including standard asynchronous DRAM, SDRAM, etc.

CPU interface block 40 is configured to receive bus operations from microprocessors 10A and 10B upon CPU bus 34, and to initiate bus operations upon CPU bus 34 in response to operations received from other devices attached thereto (e.g. coherency operations in response to memory accesses performed by other devices, etc.). If CPU interface block 40 receives a memory operation upon CPU bus 34, CPU interface block 40 routes the address of the memory operation and the corresponding tag from CPU bus 34 upon address/tag bus 52 to main memory controller 42. Additionally, the read/write nature of the memory operation is conveyed via read/write line 54. CPU interface 40 identifies touch commands using touch line 56. If the memory operation is a write memory operation, the corresponding data is conveyed via data/tag bus 58.

Request queue 44 stores the information provided by CPU interface block 40. If request queue 44 is empty prior to receipt of a memory operation and main memory 14 is idle, the memory operation may be selected by control unit 46 for presentation to main memory 14. Similarly, the touch command may be selected to directly be provided to main memory 14 if request queue 44 is empty. The touch command may be discarded if request queue 44 contains memory operations, or may be queued in request queue 44. Alternatively, the touch command may be discarded if request queue 44 is storing more than a predetermined number of queued operations. Still further, the touch command may be queued in request queue 44 and discarded if subsequent operations are queued. As mentioned above, since the touch command is speculative and no response is expected by the master, the touch command may be discarded at any point.

Generally, control unit 46 may select memory operations/touch commands from request queue 44 in order. Control unit 46 conveys the address of the selected memory operation to main memory 14 along with corresponding control information via address and control bus 16A. In the present embodiment, the control information includes a write enable line to indicate that the operation is a read or write, a row address strobe (RAS_) line to indicate that the row portion of the address is being conveyed, and a column address strobe (CAS_) line to indicate that the column address is being conveyed. Other control lines may be included as well (for example, bank select lines for selecting which bank or banks is to respond to an access, etc.). The row portion of the address is conveyed first, along with an activation of the RAS_line. Subsequently, the column portion of the address is conveyed along with an activation of the CAS_line. If the operation is a read, the selected data is provided by main memory 14 upon data bus 16B. Data buffer 50 may capture the data from the data bus under the direction of control unit 46. If the operation is a write, the write data is driven by control unit 46 upon data bus 16B.

Subsequent operations are performed in page mode if possible. Control unit 46 records which page is open (or which pages, if the banks of main memory 14 are capable of maintaining separate open pages) in open page storage 48. If a subsequent operation is performed to an open page, only the column portion of the address is transmitted, thereby achieving lower memory latency.

Control unit 46, in response to a touch command, opens the page corresponding to the address of the touch command and records the open page in open page storage 48. Opening the page may comprise transmitting the row address corresponding to the address of the touch command to main memory 14 (e.g. by deasserting the RAS_line, if asserted, and reasserting the RAS_line along with the row address). No column address nor data is transmitted. Subsequently, the open page is treated like any other open page (i.e. pages opened by performing a read/write access). If a subsequent memory operation is performed to the page, the subsequent memory operation experiences a page hit memory latency.

In one embodiment, DRAM banks 60A–60N may be accessed independently to allow multiple memory operations to be performed between main memory 14 and main memory controller 42. For such an embodiment, multiple open pages may be stored in open page storage 48.

Data buffer 50 may assemble the data from main memory 14 for read memory operations. Once the data has been assembled, the data is transferred to CPU interface 40 along with the corresponding tag presented when the read memory operation was transferred to main memory controller 42. CPU interface block 40 returns the data upon CPU bus 34, using the tag to identify the data thereon.

It is noted that request queue 44 may be implemented as separate read and write queues, as desired. Alternatively, data buffer 50 may buffer both write data for subsequent conveyance upon data bus 16B and read data for subsequent conveyance on CPU bus 34. It is noted that data buffer 50 and/or request queue 44 may be eliminated in various embodiments in favor of queuing in CPU interface block 40.

Figure 3:
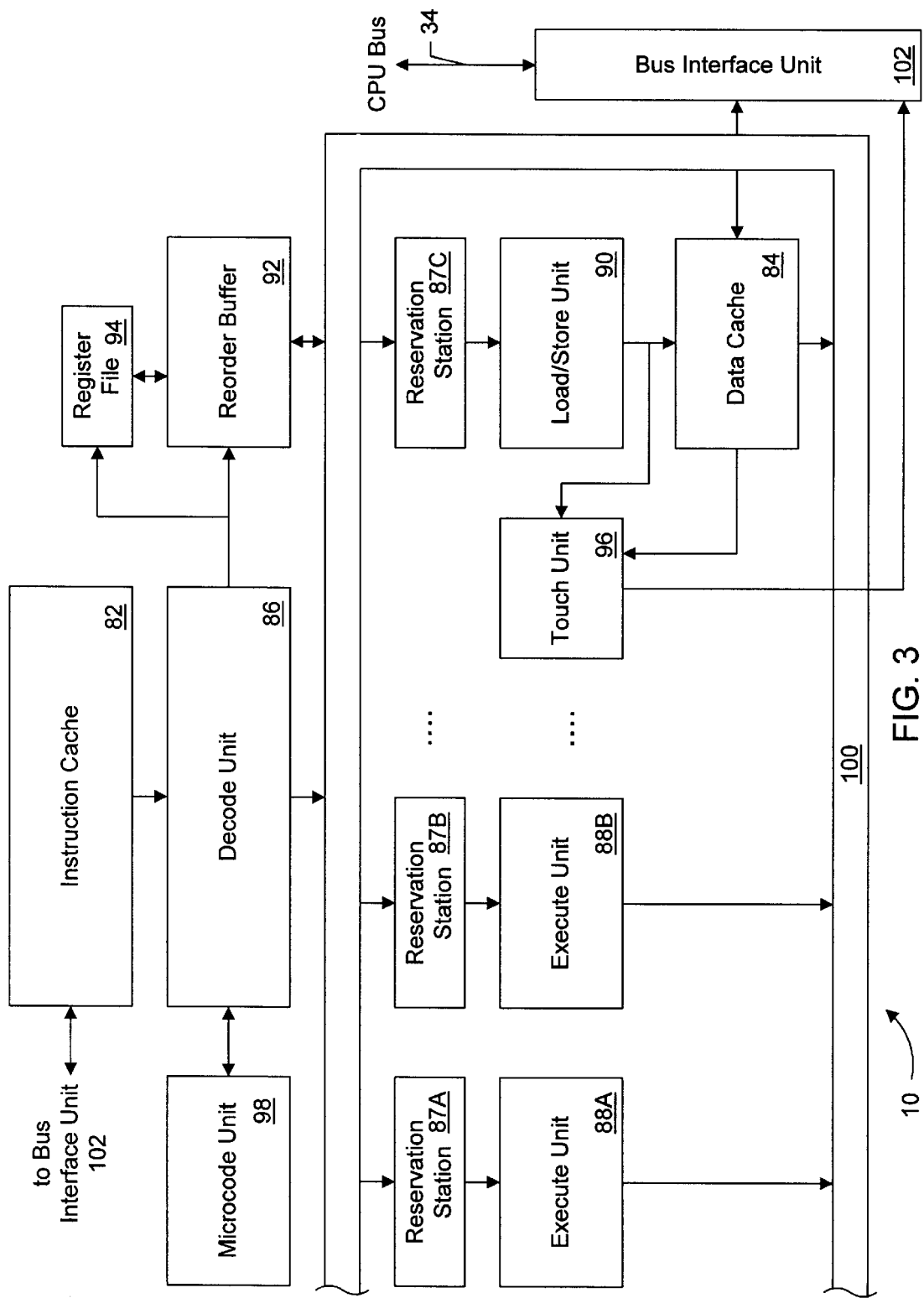
FIG. 3 is a block diagram of one embodiment of a microprocessor shown in FIG. 1.

Turning now to FIG. 3, a block diagram of one embodiment of a microprocessor 10 is shown. Microprocessor 10 may be employed as microprocessor 10A in FIG. 1, microprocessor 10B in FIG. 1, or both. Other embodiments are possible and contemplated. As shown in FIG. 3, microprocessor 10 includes an instruction cache 82, a data cache 84, a decode unit 86, a plurality of reservation stations including reservation stations 87A, 87B, and 87C, a plurality of execute units including execute units 88A and 88B, a load/store unit 90, a reorder buffer 92, a register file 94, a touch unit 96, a microcode unit 98, and a bus interface unit 102. Elements referred to herein with a particular reference number followed by a letter will be collectively referred to by the reference number alone. For example, the plurality of execute units will be collectively referred to herein as execute units 88. Execute units 88 may include more execute units than execute units 88A and 88B shown in FIG. 3. Additionally, an embodiment of microprocessor 10 may include one execute unit 88.

As shown in FIG. 3, instruction cache 82 is coupled to a main memory subsystem (not shown) and to a decode unit 86, which is further coupled to reservation stations 87, reorder buffer 92, register file 94, and microcode unit 98. Reorder buffer 92, execute units 88, and data cache 84 are each coupled to a result bus 100 for forwarding of execution results. Furthermore, each reservation station 87A and 87B is coupled to a respective execute unit 88A and 88B, while reservation station 87C is coupled to load/store unit 90. Each reservation station 87 is coupled to receive operand information from reorder buffer 92. Load/store unit 90 is coupled to data cache 84, which is further coupled to the main memory subsystem. Additionally, touch unit 96 is coupled to load/store unit 90, data cache 84, and bus interface unit 102.

Bus interface unit 102 is further coupled to data cache 84 and instruction cache 82, and to CPU bus 34.

Generally speaking, touch unit 96 is configured to monitor accesses performed by load/store unit 90 to data cache 84. As data cache hits are detected for memory operations, touch unit 96 generates touch commands for the page for which hits are being detected. Since data is being requested for the page, there is a likelihood that additional data will be requested from that page. Accordingly, opening the page in main memory 14 prepares main memory 14 to supply data from the page. If a cache miss within the page is detected, the main memory may have the page open and the cache miss may experience a page hit type memory latency instead of the full memory latency or a page miss type memory latency.

Touch unit 96 conveys generated touch commands to bus interface unit 102 for transmission upon CPU bus 34. Additionally, touch unit 96 records the page to which the touch command was executed. If subsequent hits to the page are detected, then another touch command may not be generated because touch unit 96 has recorded the earlier touch command. Touch unit 96 may further receive an indication of any snoop operations which may be conveyed from CPU bus 34 to data cache 84 by bus interface unit 102. If a snoop occurs to a page different from the recorded page, the recorded page is invalidated (because main memory 14 closes the recorded page to handle the operation corresponding to the snoop). Accordingly, subsequent cache hits to the previously recorded page may generate a touch command to reopen the page.

Touch unit 96 monitors for cache hits because cache misses will themselves be presented to main memory 14, and will open the affected page. Accordingly, cache misses need not be monitored. It is noted that microprocessor 110 may employ address translation mechanisms such as page translation mechanisms. Load/store unit 90 may include a translation lookaside buffer (TLB) for storing translations, or the TLB may be within data cache 84. Touch unit 96 is configured to receive and monitor the physical addresses of memory operations (i.e. the addresses which directly correspond to memory locations). If data cache 84 is a virtually addressed cache (e.g. a linearly addressed cache in the x86 address translation scheme), touch unit 96 may employ or have access to a TLB for generating physical addresses.

It is noted that, although the exemplary touch unit 96 described in more detail below operates upon memory operations and data cache addresses, touch unit 96 may additionally be configured to generate touch commands for instruction addresses being fetched from instruction cache 82. Embodiments of touch unit 96 which operate upon data addresses, instruction addresses, or both are specifically contemplated.

Instruction cache 82 is a high speed cache memory for storing instructions. It is noted that instruction cache 82 may be configured into a set-associative or direct mapped configuration. Instruction cache 82 may additionally include a branch prediction mechanism for predicting branch instructions as either taken or not taken. Instructions are fetched from instruction cache 82 and conveyed to decode unit 86 for decode and dispatch to a reservation station 87.

Decode unit 86 decodes each instruction fetched from instruction cache 82. Decode unit 86 dispatches the instruction to one or more of reservation stations 87 depending upon the type of instruction detected. More particularly, decode unit 86 produces a decoded instruction in response to each instruction fetched from instruction cache 82. For example, if a given instruction includes a memory operand, decode unit 86 may signal load/store unit 90 to perform a load/store (i.e. read/write) memory operation in response to the given instruction.

Decode unit 86 also detects the register operands used by the instruction and requests these operands from reorder buffer 92 and register file 94. In one embodiment, execute units 88 are symmetrical execution units. Symmetrical execution units are each configured to execute a particular subset of the instruction set employed by microprocessor 10. The subsets of the instruction set executed by each of the symmetrical execution units are the same. In another embodiment, execute units 88 are asymmetrical execution units configured to execute dissimilar instruction subsets. For example, execute units 88 may include a branch execute unit for executing branch instructions, one or more arithmetic/logic units for executing arithmetic and logical instructions, and one or more floating point units for executing floating point instructions. Decode unit 86 dispatches an instruction to a reservation station 87 which is coupled to an execute unit 88 or load/store unit 90 which is configured to execute that instruction.

Microcode unit 98 is included for handling instructions for which the architecturally defined operation is more complex than the hardware employed within execute units 88 and load/store unit 90 may handle. Microcode unit 98 parses the complex instruction into multiple instructions which execute units 88 and load/store unit 90 are capable of executing.

Load/store unit 90 provides an interface between execute units 88 and data cache 84. Load and store memory operations are performed by load/store unit 90 to data cache 84. Additionally, memory dependencies between load and store memory operations are detected and handled by load/store unit 90. A memory operation may be an implicit part of an instruction which performs an operation upon a memory operand, or may be the explicit operation of an instruction (i.e. the instruction performs data movement only). When an instruction includes a memory operation, one or more of the operands of the instruction are used to generate the address of the memory operation. These operands are referred to as "address operands" and may be register operands as well as immediate/displacement data from the instruction encoding itself.

Reservation stations 87 are configured to store instructions whose operands have not yet been provided. An instruction is selected from those stored in a reservation station 87A–87C for execution if: (1) the operands of the instruction have been provided, and (2) the instructions within the reservation station 87A–87C which are prior to the instruction being selected in program order have not yet received operands. It is noted that a centralized reservation station may be included instead of separate reservations stations. The centralized reservation station is coupled between decode unit 86, execute units 88, and load/store unit 90. Such an embodiment may perform the dispatch function within the centralized reservation station.

Microprocessor 10 supports out of order execution, and employs reorder buffer 92 for storing execution results of speculatively executed instructions and storing these results into register file 94 in program order, for performing dependency checking and register renaming, and for providing for mispredicted branch and exception recovery. When an instruction is decoded by decode unit 86, requests for register operands are conveyed to reorder buffer 92 and register file 94. In response to the register operand requests, one of three values is transferred to the reservation station 87A–87C which receives the instruction: (1) the value stored in reorder buffer 92, if the value has been speculatively generated; (2) a tag identifying a location within reorder buffer 92 which will store the result, if the value has not been speculatively generated; or (3) the value stored in the register within register file 94, if no instructions within reorder buffer 92 modify the register. Additionally, a storage location within reorder buffer 92 is allocated for storing the results of the instruction being decoded by decode unit 86. The storage location is identified by a tag, which is conveyed to the unit receiving the instruction. It is noted that, if more than one reorder buffer storage location is allocated for storing results corresponding to a particular register, the value or tag corresponding to the last result in program order is conveyed in response to a register operand request for that particular register.

When execute units 88 or load/store unit 90 execute an instruction, the tag assigned to the instruction by reorder buffer 92 is conveyed upon result bus 100 along with the result of the instruction. Reorder buffer 92 stores the result in the indicated storage location. Additionally, reservation stations 87 compare the tags conveyed upon result bus 100 with tags of operands for instructions stored therein. If a match occurs, the unit captures the result from result bus 100 and stores it with the corresponding instruction. In this manner, an instruction may receive the operands it is intended to operate upon. Capturing results from result bus 100 for use by instructions is referred to as "result forwarding".

Instruction results are stored into register file 94 by reorder buffer 92 in program order. Storing the results of an instruction and deleting the instruction from reorder buffer 92 is referred to as "retiring" the instruction. By retiring the instructions in program order, recovery from incorrect speculative execution may be performed. For example, if an instruction is subsequent to a branch instruction whose taken/not taken prediction is incorrect, then the instruction may be executed incorrectly. When a mispredicted branch instruction or an instruction which causes an exception is detected, reorder buffer 92 discards the instructions subsequent to the mispredicted branch instructions. Instructions thus discarded are also flushed from reservation stations 87, execute units 88, load/store unit 90, and decode unit 86.

Register file 94 includes storage locations for each register defined by the microprocessor architecture employed by microprocessor 10. For example, microprocessor 10 may employ the x86 microprocessor architecture. For such an embodiment, register file 94 includes locations for storing the EAX, EBX, ECX, EDX, ESI, EDI, ESP, and EBP register values.

Data cache 84 is a high speed cache memory configured to store data to be operated upon by microprocessor 10. It is noted that data cache 84 may be configured into a set-associative or direct-mapped configuration. Data cache 84 allocates and deallocates storage for data in cache lines. A cache line is a block of contiguous bytes. The byte within the cache line which has the lowest numerical address is stored at an address which is aligned to a cache line boundary.

Bus interface unit 102 effects communication between microprocessor 10 and devices coupled thereto via CPU bus 34. For example, instruction fetches which miss instruction cache 82 may be transferred from main memory 14 by bus interface unit 102. Similarly, data requests performed by load/store unit 90 which miss data cache 84 may be transferred from main memory 14 by bus interface unit 102. Additionally, data cache 84 may discard a cache line of data which has been modified by microprocessor 10. Bus interface unit 102 transfers the modified line to the main memory.

It is noted that decode unit 86 may be configured to dispatch an instruction to more than one execution unit. For example, in embodiments of microprocessor 10 which employ the x86 microprocessor architecture, certain instructions may operate upon memory operands. Executing such an instruction involves transferring the memory operand from data cache 84, executing the instruction, and transferring the result to memory (if the destination operand is a memory location) or data cache 84. Load/store unit 90 performs the memory operations, and an execute unit 88 performs the execution of the instruction.

Figure 4:
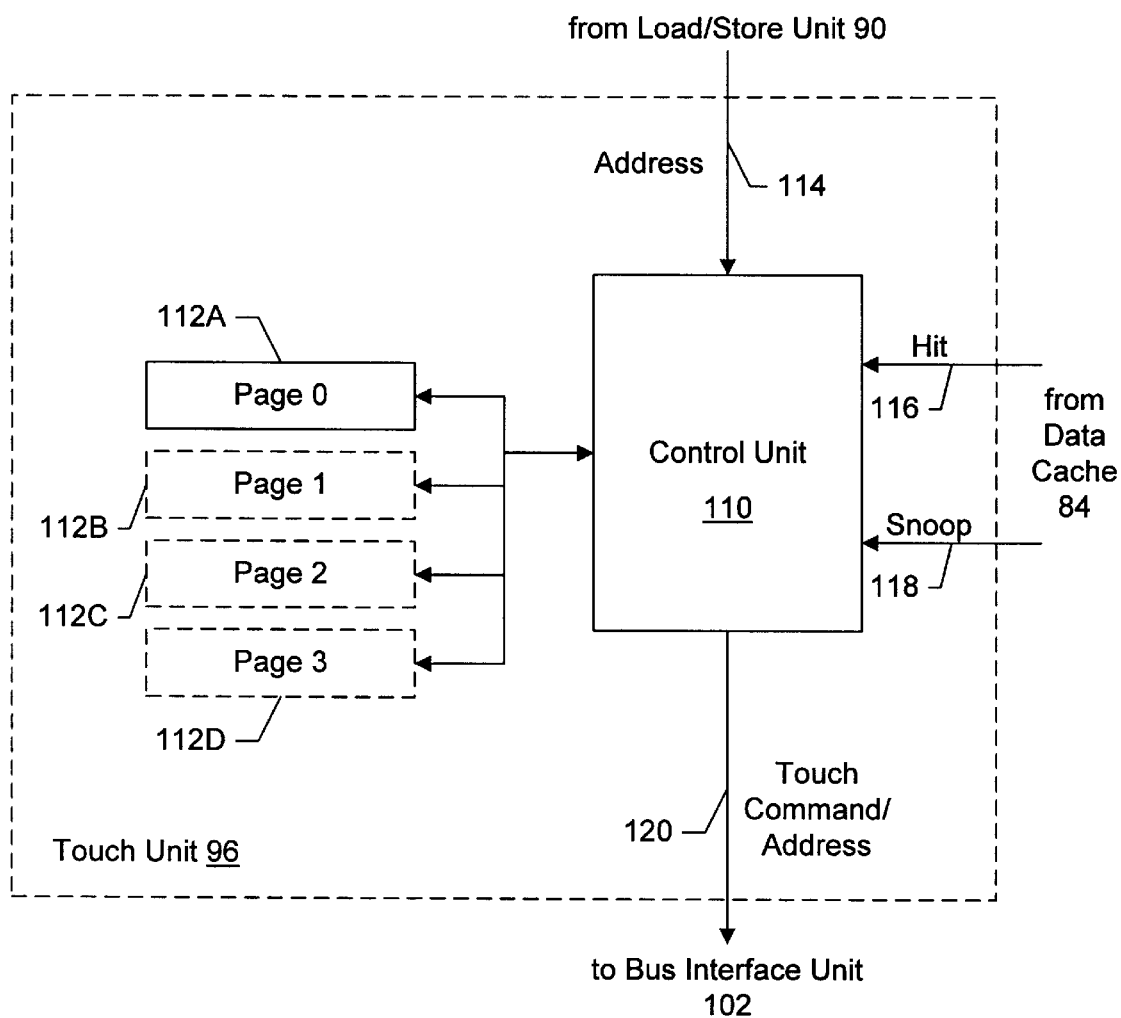
FIG. 4 is a block diagram of one embodiment of a touch unit shown in FIG. 3.

Turning now to FIG. 4, a block diagram of one embodiment of touch unit 96 is shown. Other embodiments are possible and contemplated. As shown in FIG. 4, touch unit 96 includes a control unit 110 coupled to one or optionally several page registers 112A–112D. Control unit 110 is coupled to an address bus 114 from load/store unit 90, a hit line 116 and a snoop bus 118 from data cache 84, and a touch command/address bus 120 to bus interface unit 102.

Control unit 110 is coupled to receive addresses being conveyed to data cache 84 from load/store unit 90 upon address bus 114. Corresponding hit/miss indications are received via hit line 116. More than one address may be transmitted to data cache 84 during a clock cycle, in which case multiple address buses 114 and hit lines 116 may be employed. If a hit signal is asserted on hit line 116, then control unit 110 examines the address for a possible touch command. Control unit 110 compares the page portion of the address to the page portions stored in page registers 112A–112D. If a match is detected, then control unit 110 may inhibit generation of a touch command, as a touch command has already been conveyed for the page. If no match is detected, than a touch command may be generated. The touch command and address are conveyed upon touch command/address bus 120 to bus interface unit 102. Bus interface unit 102 subsequently transmits the touch command upon CPU bus 34. The address of the touch command may be the address provided upon address bus 114.

Page registers 112A–112D are each configured to store at least the page portion of an address and a valid bit indicating whether the address is valid. Only the page portion may be stored, or the full address may be stored, as desired. In order for a match between the address conveyed upon address bus 114 and an address stored in page registers 112A–112D to occur, the row address portion of the addresses compare equal and the valid bit is set (indicating validity). The page portion of the address includes at least the row address, and may include bits which determine the bank selected by the address as well as additional address bits (if desired).

Control unit 110 receives snoop addresses from data cache 84 upon snoop bus 118. As used herein, a "snoop" refers to observing an address of a bus operation being conveyed by another device upon CPU bus 34, and conveying that address (the "snoop address") to the caches to determine if data corresponding to the address is stored therein. Snooping is a common method for maintaining cache coherency in multi-master computer systems such as some embodiments of computer system 5.

Control unit 110 receives snoop addresses in order to detect that a page opened via a previous touch command is being closed by an operation being performed by the other device. Accordingly, control unit 110 compares the page portion of the snoop address to the page portion of the addresses stored in page registers 112A–112D. If a mismatch is detected, the valid bit within the corresponding page register is reset. Accordingly, if addresses within a page which mismatches with the snoop address subsequently hit in data cache 84, another touch command may be generated to open the page within main memory 14 subsequent to the occurrence of the snooped operation. Control unit 110 may receive only the page portion of the snoop address via snoop bus 118, in one embodiment.

In one embodiment, touch unit 96 may include multiple page registers 112A–112D and may be programmable as to the number of registers used during operation. For example, an operating system may program touch unit 96 to use a number of registers 112A–112D equal to the number of open pages concurrently maintainable by memory controller 42. For example, the number may be the number of banks of DRAM within main memory 14. Furthermore, touch unit 96 may be programmable as to which portion of the address is the page-defining portion (e.g. the row address and bank selection portion of the address). In this manner, touch unit 96 may be flexible for connection to a variety of memory configurations.

Touch unit 96 may be configured to record a predetermined number of cache hits prior to generating a touch command for a given page. By recording a predetermined number of cache hits, the most frequently hitting pages may be opened in main memory 14 as opposed to less frequently hitting pages. Page registers 112A–112D may include a count field for counting hits in such embodiments.

Figure 5:
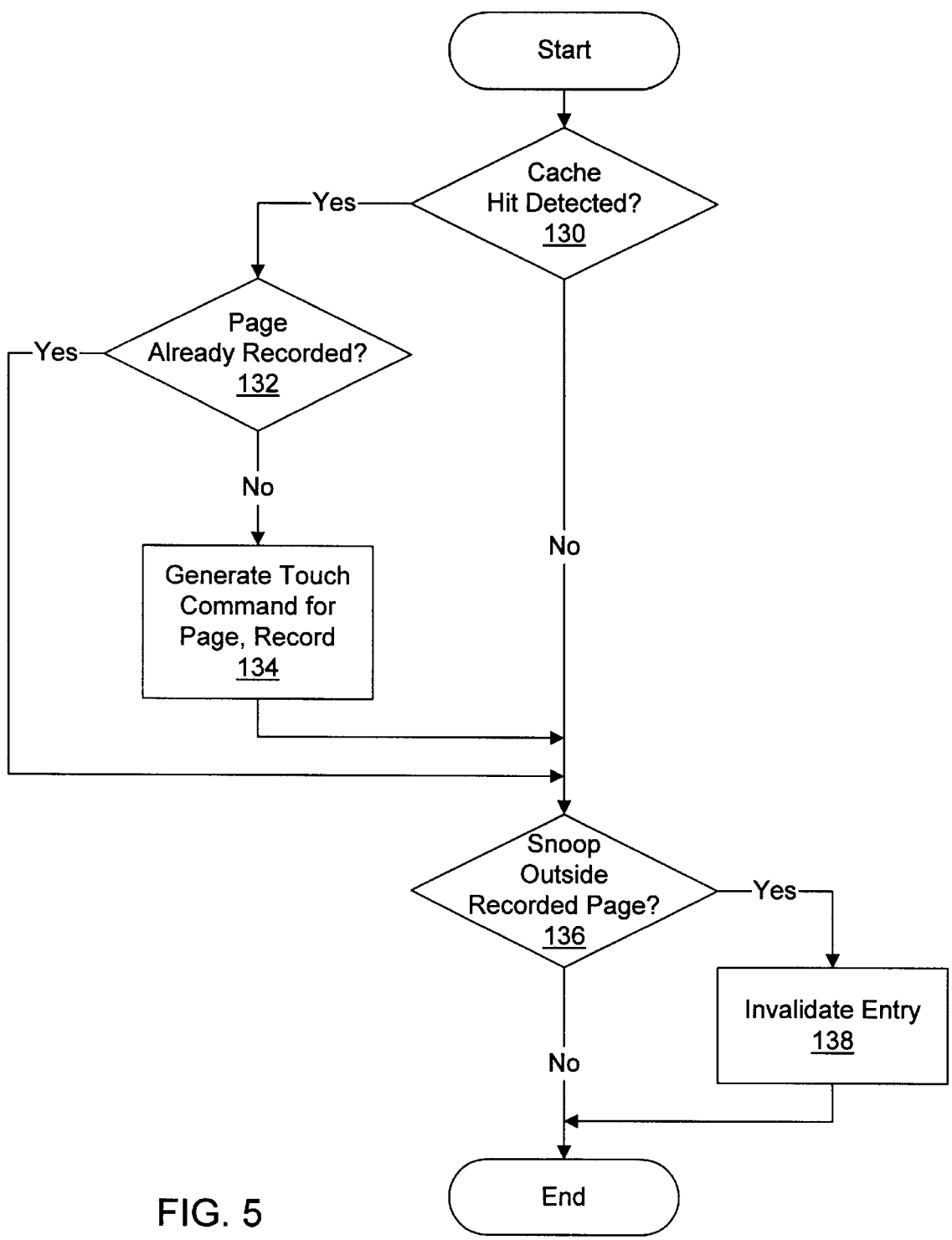
FIG. 5 is a flowchart illustrating operation of one embodiment of a touch unit shown in FIGS. 3 and 4.

Turning now to FIG. 5, a flowchart illustrating operation of one embodiment of touch unit 96 during a clock cycle is shown. Other embodiments are possible and contemplated. While the steps shown in FIG. 5 are in some cases shown serially for ease of understanding, it is noted that the steps may be performed in any suitable order. Furthermore, steps may be performed in a parallel fashion in combinatorial logic employed within touch unit 96.

Touch unit 96 determines whether or not an address presented by load/store unit 90 is a cache hit by observing the hit line provided by data cache 84 (decision block 130). If the address is not a cache hit, then a touch command is not generated for that address. On the other hand, if the address is a cache hit, touch unit 96 determines if the page including the address has already been recorded in page registers 112A–112D (decision block 132). If the page has already been recorded, then a touch command is not generated for that address since a touch command has previously been generated for that address. If the page has not already been recorded, then a touch command is generated for the page and the page is recorded in page registers 112A–112D (step 134). The particular page register 112A–112D selected to record the touch command may be selected according to any suitable algorithm. For example, a page register 112A–112D which is not storing a valid address may be selected. If each page register 112A–112D is storing a valid address, control unit 110 may maintain a least recently used (LRU) indication among the registers (i.e. the LRU register is the register for which the page has least recently been hit by a cache hit memory operation), and the least recently used register 112A–112D may be selected. Alternatively, if registers 112A–112D store a count of the number of hits detected to the page, the register 112A–112D storing the lowest count may be selected.

Touch unit 96 also determines, if a snoop address is conveyed during the clock cycle, whether or not a snoop hit on a recorded page is detected (decision block 136). If a snoop address outside the recorded page is detected, the entry is invalidated (step 138). For example, the valid bit in the page register 112A–112D which is to a different page than the snoop address is invalidated.

Figure 6:
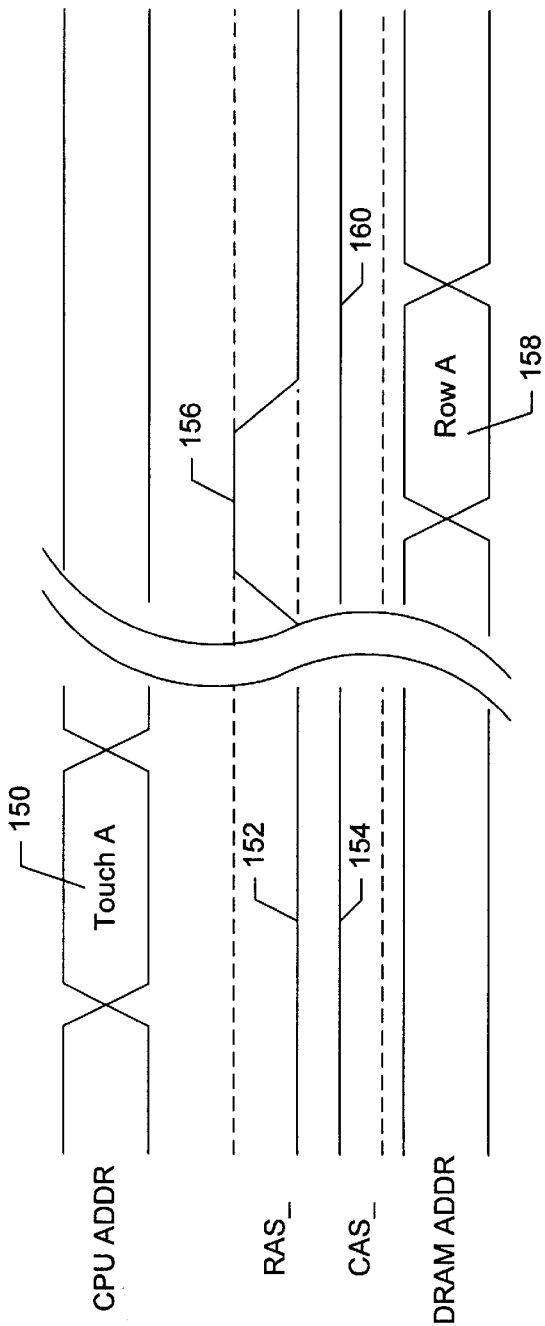
FIG. 6 is a timing diagram illustrating operation of a touch command according to one embodiment of the computer system shown in FIG. 1 employing asynchronous DRAM.

Turning now to FIG. 6, a timing diagram illustrating operation of one embodiment of memory controller 42 is shown when main memory 14 comprises standard asynchronous DRAMs. Other embodiments are possible and contemplated. As shown in FIG. 6, a touch command to an address "A" is conveyed on the address portion of CPU bus 34 (reference numeral 150). At the time address "A" is conveyed, a particular row is active within a DRAM bank in main memory 14 as illustrated by the active low RAS_line (reference numeral 152). However, the CAS_line is inactive (reference numeral 154), and hence no data is being transferred to or from the DRAM bank.

After a period of time illustrated by the break lines in FIG. 6, memory controller 42 receives the touch command. Accordingly, the RAS_line is precharged and asserted with the row address corresponding to address "A" on the address lines to the DRAM bank (reference numeral 156 for the RAS_line and reference numeral 158 for row address A). However, the CAS_line remains deasserted (reference numeral 160). In this manner, the page corresponding to row address A is opened within the DRAM bank.

Figure 7:
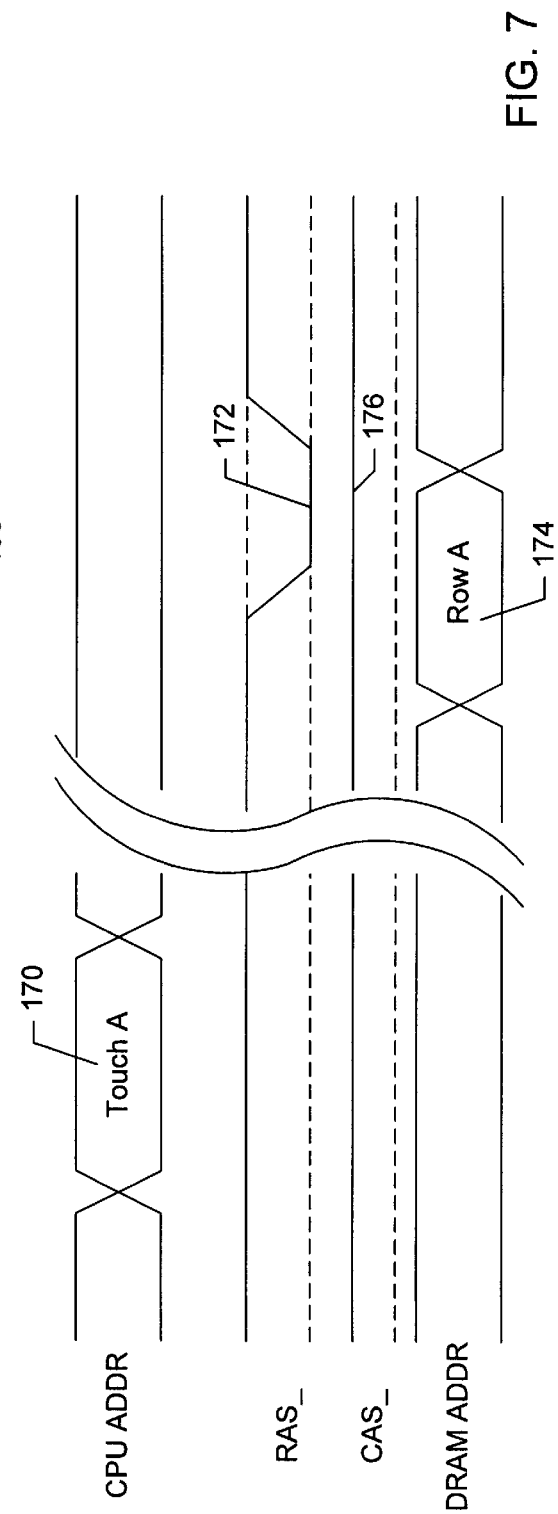
FIG. 7 is a timing diagram illustrating operation of a touch command according to another embodiment of the computer system shown in FIG. 1 employing SDRAM.

Turning now to FIG. 7, a timing diagram illustrating operation of one embodiment of memory controller 42 is shown when main memory 14 comprises SDRAMs. Other embodiments are possible and contemplated. As shown in FIG. 7, a touch command to an address "A" is conveyed on the address portion of CPU bus 34 (reference numeral 170). After a period of time illustrated by the break lines in FIG. 7, memory controller 42 receives the touch command. Accordingly, the RAS_line is asserted with the row address corresponding to address "A" on the address lines to the DRAM bank (reference numeral 172 for the RAS_line and reference numeral 174 for row address A). For SDRAM, the RAS_line is pulsed low to indicate the presentation of the row address and then returns high. However, the CAS_line remains deasserted (reference numeral 176), and hence no data transfer occurs. In this manner, the page corresponding to row address A is opened within the DRAM bank.

In accordance with the above disclosure, a computer system has been shown which employs a touch command to open a DRAM page. The page may be opened upon determining that the page may potentially be accessed by a memory operation. If the memory operation does access the page, then the memory operation may experience a page hit type memory latency instead of a non-page mode type memory latency or a page miss type memory latency. Overall memory latency may be reduced, and may thereby lead to increased performance of the computer system.

Numerous variations and modifications will become apparent to those skilled in the art once the above disclosure is fully appreciated. It is intended that the following claims be interpreted to embrace all such variations and modifications.

What is claimed is:

1. A microprocessor comprising:

a load/store unit configured to perform a memory operation;

a data cache coupled to receive said memory operation from said load/store unit, wherein said data cache is configured to determine if said memory operation hits in said data cache and to output a hit signal in response thereto; and a touch unit coupled to receive said memory operation from said load/store unit, wherein said dataless touch unit is configured to generate a touch command in response to said memory operation and said hit signal indicating that said memory operation hits in said data cache.

2. The microprocessor as recited in claim 1 wherein said touch unit comprises at least one register, and wherein said at least one register is configured to store an address corresponding to said memory operation in said at least one register.

3. The microprocessor as recited in claim 2 wherein said load/store unit is configured to perform a second memory operation.

4. The microprocessor as recited in claim 3 wherein said touch unit is configured to compare a second address corresponding to said second memory operation to said address stored in said at least the register, and wherein said touch unit is configured to inhibit generation of a second touch command corresponding to said second address if said second address is in a same page as said address, even if said hit signal indicates that said second memory operation hits in said data cache.

5. The microprocessor as recited in claim 4 wherein said touch unit is further configured to record an indication of said second memory operation being in said same page as said address.

6. The microprocessor as recited in claim 2 further comprising a bus interface unit coupled to said touch unit, wherein said bus interface unit is configured to transmit said dataless touch command upon a CPU bus to which said bus interface unit is coupled.

7. The microprocessor as recited in claim 6 wherein said bus interface unit is further configured to receive a snoop address upon said CPU bus and to convey said snoop address to said touch unit, and wherein said touch unit is further configured to compare said snoop address to said address stored in said at least one register and to invalidate said address if said snoop address is not in said same page with said address.

8. A computer system comprising:
a main memory;
a microprocessor configured to generate a dataless touch command in response to a hit in a cache within said microprocessor by a memory operation; and
a memory controller coupled to said microprocessor and to said main memory, wherein said memory controller is configured to open a page within said main memory corresponding to said memory operation responsive to said dataless touch command.

9. The computer system as recited in claim 8 wherein said main memory comprises one or more dynamic random access memories (DRAMs).

10. The computer system as recited in claim 9 wherein said memory controller opens said page by asserting a row address strobe signal to said one or more DRAMs and conveying a row portion of an address corresponding to said memory operation, and wherein said address is included in said dataless touch command.

11. The computer system as recited in claim 8 wherein said touch command includes an address corresponding to said memory operation, and wherein said microprocessor is configured to record said address.

12. The computer system as recited in claim 11 wherein said microprocessor is further configured to inhibit generation of a second dataless touch command in response to a subsequent memory operation hitting in said cache if said subsequent memory operation includes a second address within said page.

13. The computer system as recited in claim 12 wherein said microprocessor is further configured to record a plurality of said addresses corresponding to a plurality of said dataless touch commands.

14. The computer system as recited in claim 13 wherein a number of said plurality of said addresses is equal to a number of open pages concurrently maintainable by said main memory.

15. The computer system as recited in claim 14 wherein said number is a number of banks included within said main memory.

16. The computer system as recited in claim 8 wherein said memory controller is configured not to transfer data from said main memory in response to said touch command.

17. The computer system as recited in claim 8 wherein said computer system comprises a bus bridge coupled to said microprocessor and to said main memory, and wherein said bus bridge is further coupled to a peripheral bus to which a plurality of input/output devices are connectable, and wherein said memory controller is integrated into said bus bridge.

18. A method for decreasing memory latency in a computer system comprising:
detecting that a memory operation performed by a microprocessor within said computer system hits in a cache within said microprocessor;
transmitting a dataless touch command including an address corresponding to said memory operation to a memory controller within said computer system responsive to said detecting; and
opening a page within a memory coupled to said memory controller responsive to said transmitting.

19. The method as recited in claim 18 further comprising:
detecting that a second memory operation performed by said microprocessor hits in said cache and that a second address corresponding to said second memory operation is in said page; and
inhibiting a transmittal of a second dataless touch command corresponding to said second memory operation responsive to said detecting that said second memory operation performed by said microprocessor hits in said cache and that a second address corresponding to said second memory operation is in said page.

20. The method as recited in claim 18 further comprising:
recording said address included in said dataless touch command;
snooping said address against a second address transmitted to said microprocessor from a source other than said microprocessor; and
invalidating said recording if said second address and said address are within a same page.

21. A touch unit for a microprocessor, comprising:
at least one register, wherein said register is configured to store a first address corresponding to a first dataless touch command previously generated by said touch unit; and
a control unit coupled to said at least one register and to receive a second address corresponding to a memory operation and a hit signal indicative of a hit/miss status of said memory operation in a cache, wherein said control unit is configured to generate a second dataless touch command responsive to said second memory operation if:
(i) said second memory operation is a hit in said cache; and
(ii) said second address is in a different page than said first address.

* * * * *

UNITED STATES PATENT AND TRADEMARK OFFICE
CERTIFICATE OF CORRECTION

PATENT NO. : 5,983,325

DATED : November 9, 1999

INVENTOR(S) : W. Kurt Lewchuk

It is certified that error appears in the above-identified patent and that said Letters Patent is hereby corrected as shown below:

In the Claims:

Claim 1, col. 15, line 2, after "wherein said", please delete "dataless".

Claim 1, col. 15, line 3, before "touch command", please insert --dataless--.

Claim 4, col. 15, line 18, after "at least", please delete "the" and insert --one-- in place thereof.

Claim 11, col. 15, line 57, before "touch command", please insert --dataless--.

Signed and Sealed this

Fourth Day of July, 2000

Attest:

Q. TODD DICKINSON

*Attesting Officer*     *Director of Patents and Trademarks*